Nov. 10, 1925.
L. JAENICHEN
1,560,823
CONTROL DEVICE FOR LIQUID RECEPTACLES
Filed Sept. 21, 1923
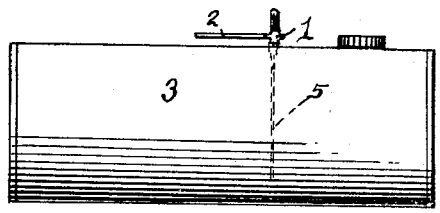
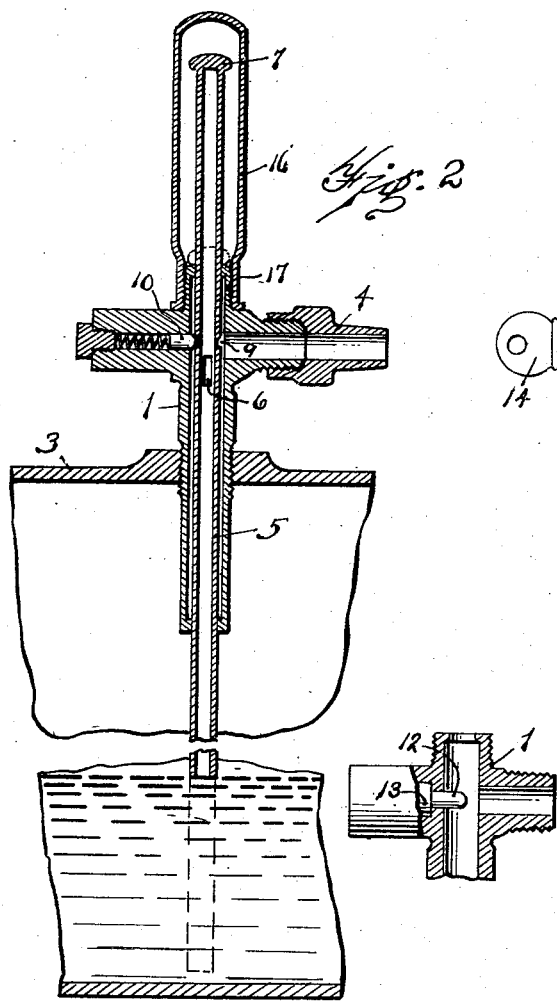
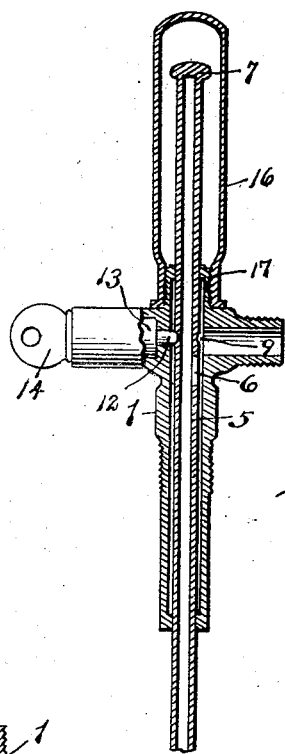
INVENTOR.
Louis Jaenichen
BY
Edward N. Pagelsen
ATTORNEY.

Patented Nov. 10, 1925.

1,560,823

UNITED STATES PATENT OFFICE.

LOUIS JAENICHEN, OF DETROIT, MICHIGAN.

CONTROL DEVICE FOR LIQUID RECEPTACLES.

Application filed September 21, 1923. Serial No. 664,136.

*To all whom it may concern:*

Be it known that I, LOUIS JAENICHEN, a citizen of the United States, and residing at Detroit, in the county of Wayne and State of Michigan, have invented new and Improved Control Devices for Liquid Receptacles, of which the following is a specification.

This invention relates to means for so controlling the withdrawal of the contents of fuel and other receptacles that a predetermined reserve will be left in the receptacles when the control members are in one position and the entire contents may be withdrawn when the control members are in another position, and the object of this invention is to provide a control device of this character which shall be simple in construction, easily operated, and which may be used as a safety lock for the automobile on which a fuel receptacle of this character is mounted.

This invention consists, in combination with a receptacle and a suction connection attached thereto, of a suction tube slidable in said connection and having a closed upper end and an aperture intermediate its ends opening into the suction connection, said connection being of such length that said aperture in the tube will be within said connection when the tube is in its normal position and when it extends to the bottom of the reserve liquid.

It further consists in key controlled means for preventing the introduction of a suction tube when that has been entirely withdrawn, so as to prevent unauthorized removal of the liquid from the receptacle.

It also consists in the details of construction illustrated in the accompanying drawing and particularly pointed out in the claims.

In the drawing, Fig. 1 is an elevation of a fuel tank equipped with my improved control device. Fig. 2 is a central vertical section of this control device. Fig. 3 is a similar section of a modified form thereof. Fig. 4 is a detail of this modified form.

Similar reference characters refer to like parts throughout the several views.

The suction connection 1 is substantially tubular and is attached to the top of a fuel tank 3 by screwing into said top, and a union 4 is adapted to receive a pipe 2 which extends therefrom to the place of consumption, for example, the engine of the automobile if the tank is mounted on a motor vehicle. Slidable vertically in this connection is a suction tube 5 which has an open lower end, a closed upper end and an aperture 6 between its ends. The upper end may be provided with a knob 7 if desired. The suction connection 1 is so machined that the fit around the tube 5 at both the top and bottom of the connection is sufficiently air tight and the space between these ends and the connection is expanded so that the tube is entirely free and out of contact with the connection. As a result, a free and unobstructed passage exists at all times from the bottom of the tube 5 to the discharge union 4, no matter how far the tube is turned or moved up or down, so long as the aperture 6 therein does not pass out beyond the ends of the connection.

I prefer to form a small groove 9 in the tube to receive the spring pressed pin 10 mounted in the connection, which pin holds the tube in its normal upper position. While there, fuel may be drawn from the tank through this tube until a predetermined reserve only is left in the tank, the stoppage of the flow of fuel warning the operator in charge that the supply is low. He thereupon forces down the tube 5 into the fuel reserve and again starts his engine or other consumer of fuel. A cap 16 may screw onto the hub 17 of the connection 1 to protect the tube 5 from damage and prevent meddling.

This device may be employed as a safety lock for the vehicle. When this tube is entirely withdrawn, no fuel can be drawn from the tank through the discharge pipe. In order to prevent an unauthorized tube being introduced, the spring pressed pin 10 may be replaced by a pin 12 mounted in a lock 13 which receives a key 14 whereby the pin 12 may be withdrawn to permit the tube 5 to be slid down to normal position, the key being taken out when the tube is in normal position. When the tube is entirely withdrawn, this pin 12 is forced by its spring into the path of the tube and thus prevents the introduction of this or a similar tube except when withdrawn by a key 14.

The cap 16 may form an air tight joint with the hub 17, in which case the fit between the pipe 5 and the ends of the connection may be quite loose, only sufficient friction being necessary to prevent the pipe from sliding down. If the cap 16 is omitted, the fit at the upper end of the connection must be so tight that insufficient air passes through to break the suction within the pipe.

I claim:—

1. In combination with a receptacle, a tubular suction connection attached thereto in vertical position, a suction tube slidable in said connection and having an aperture intermediate its ends communicating with the interior of the connection, said connection forming a sliding joint at its lower end around said tube, a cap closing the upper end of said connection, spring pressed means for holding the tube in its normal position and adapted to extend across the path of said tube when that is entirely withdrawn, and a key controlled device to withdraw the pin from said path.

2. In combination with a receptacle, a tubular suction connection attached thereto in vertical position, a suction tube slidable in said connection and having a closed upper end and an aperture intermediate its ends communicating with the interior of the connection, said connection forming a sliding joint at its upper and lower ends around said tube, and spring pressed means for holding the tube in its normal position and adapted to extend across the path of said tube when that is entirely withdrawn, and a key controlled device to withdraw the pin from said path.

LOUIS JAENICHEN.